A. D. SMITH.
Gate.

No. 62,975.  Patented March 19, 1867.

Witnesses:
W. H. Burridge
Frank Alden.

Inventor:
A. D. Smith

United States Patent Office.

A. D. SMITH, OF GRAFTON, OHIO.

Letters Patent No. 62,975, dated March 19, 1867.

---

IMPROVEMENT IN FARM GATES.

---

The Schedule referred to in these Letters Patent and making part of the same.

---

TO ALL WHOM IT MAY CONCERN:

Be it known that I, A. D. SMITH, of Grafton, in the county of Lorain, and State of Ohio, have invented certain new and useful improvements in Farm Gates; and I do hereby declare that the following is a full and complete description of the construction and operation of the same, reference being had to the accompanying drawings, making a part of this specification, in which—

Like letters of reference refer to like parts in the views.

Figure 1:
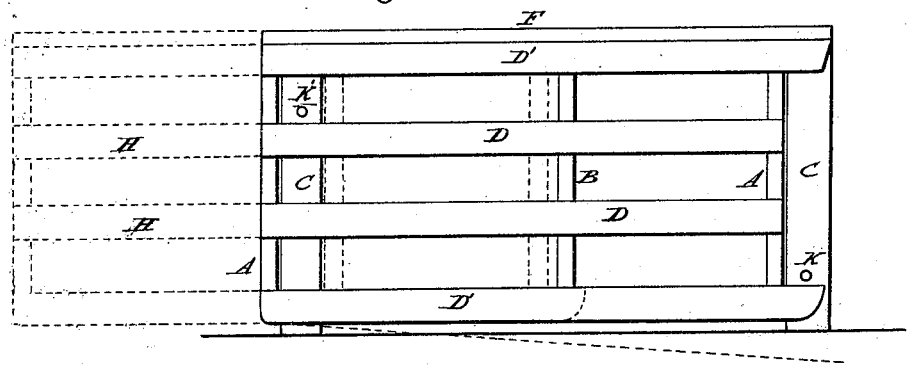
Figure 1 is a side view of the gate when closed.
Figure 2:
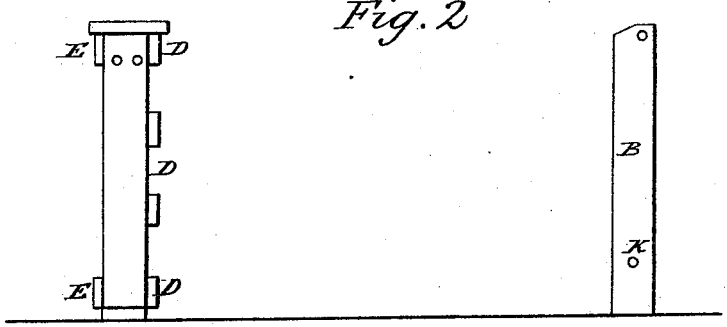
Figure 2 is an end view when opened.
Figure 3:
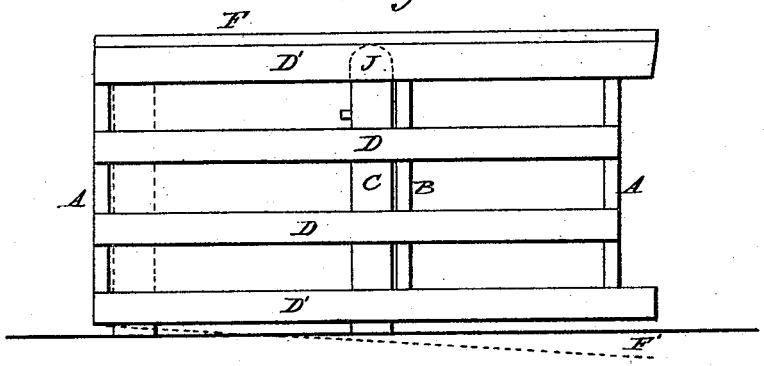
Figure 3 is a view of the gate when half way opened.

This gate consists of the side pieces A, fig. 1, and the central brace B, which are of the usual height of a gate, and in width corresponding to the thickness of the posts C C. To these side pieces and brace are nailed or otherwise secured the boards D, the height and number of which being as the height and width of the gate required. E, fig. 2, are boards nailed to the opposite side of the pieces A, corresponding with the boards D'. F is a weather-board covering the top of the gate. K are pins to which reference will hereafter be made. This gate is hung upon the post C, which is introduced between the boards, as shown in fig. 1. In order to open it, it is shoved back, in the direction indicated by the dotted lines H, until the brace B strikes the post. The gate at this point is half way open, as shown in fig. 3, and hangs balanced on the post upon which it was slid back, thus making a small gate for the passage of persons. For a further opening of the gate it is swung around in either direction until in line with the passage way, thus giving a full opening of the gate for the passage of teams, carriages, &c. The latch end of the gate, when closed, hangs upon the post C, the weather-board referred to being made to project beyond the gate for that purpose; also the top and bottom boards are made to project and thus embrace the post, and thereby prevent the gate from all sideway movement, making it thus secure and permanent at the weaker end. By thus hanging both ends of the gate upon the post, when closed, there is no possible sagging of the one nor falling of the other; hence, the gate is at all times free to swing over the ground on opening. The top of the post on which the gate swings being rounded, as shown at J, fig. 3, allows the end of the gate to drop easily to the ground when opened, as indicated by the dotted lines F', and by its weight is thereby prevented from being shut by the wind; it also allows of its being lifted in order to avoid any obstruction, as snow-drifts, &c. The cap or weather-board F, by its width and position, not only gives additional strength to the gate, but protects the posts from rain and exposure, hence they are less liable to check and decay. By lifting up the gate so as to allow the bottom of the board D' to rest upon the pin K, fig. 1, and the bottom of the board, next below the top, to rest upon the pin K', small animals can then pass under, at the same time the larger stock are kept back; thus, for farm purposes, making the gate of greater value.

The construction of this gate is simple, easily made, and cheap, requiring for ordinary purposes only four boards of from five to six inches in width, and some twelve feet in length, with the side pieces and cap, in all not exceeding forty-five feet of lumber, and some fifty nails.

What I claim as my improvement, and desire to secure by Letters Patent, is—

The gate A constructed and described, in combination with the posts B C; the post B being so arranged in relation to the gate that it forms the support, fulcrum, and slide combined, upon which the gate rests, slides, and turns when being opened and closed as described.

A. D. SMITH.

Witnesses:
J. H. BURRIDGE,
W. H. BURRIDGE.